US005996765A

United States Patent [19]

Ock

[11] Patent Number: 5,996,765

[45] Date of Patent: Dec. 7, 1999

[54] VENDING MECHANISM OF VENDING MACHINE

[75] Inventor: Jeong-Pyo Ock, Kwangju, Rep. of Korea

[73] Assignee: Kwangju Electronics Co., Ltd., Kwangju, Rep. of Korea

[21] Appl. No.: 08/975,123

[22] Filed: Nov. 20, 1997

[30] Foreign Application Priority Data

Jul. 22, 1997 [KR] Rep. of Korea ...................... 97-34303

[51] Int. Cl.[6] ........................................................ G06F 7/00

[52] U.S. Cl. ............................................ 194/217; 221/129

[58] Field of Search .................................... 194/217, 218; 221/129

[56] References Cited

U.S. PATENT DOCUMENTS 4,499,985 2/1985 Schuller ................................. 194/217

FOREIGN PATENT DOCUMENTS 35 01 025 7/1986 Germany ............................... 194/217

0 126 391 5/1990 Japan .................................... 194/217

*Primary Examiner*—Robert P. Olszewski

*Assistant Examiner*—Bryan Jaketic

*Attorney, Agent, or Firm*—Perman & Green, LLP

[57] ABSTRACT

A vending mechanism for a vending machine, including the steps of: if a user first selects an article by using an article selection panel after putting money into the vending machine, dispensing the user with the selected article; and if the user selects another article second by using the srticle selection panel and the remainder of the input money is more than the price of the second-selected article while supplying him or her with the first-selected article, dispensing him or her with the second-selected aritcle.

8 Claims, 5 Drawing Sheets

VENDING MECHANISM OF VENDING MACHINE

BACKGROUND OF THE INVENTION

1. Field of the Invention

The present invention relates to a vending machine. More particularly, it relates to a vending mechanism of a vending machine by which different kinds of articles for sale, held in the vending machine can be simultaneously obtained from the same vending machine.

2. Description of the Prior Art

A vending machine generally holds packets of cigarettes, containers of coffee, drinks, snacks, and books, so consumers can obtain them by putting coins into it. FIG. 1 depicts a conventional vending machine. As shown in FIG. 1, the vending machine includes a casing 1, a door 2 that is hinged on one side of the front of casing 1 for opening and closing casing 2, a doorknob 3 used when opening and closing door 2, a coin slot 4 into which coins for a user-selected article are put, and a paper money slot 5 into which paper money is put.

The vending machine also includes an article selection panel 5 with a plurality of keys used to choose a user-desired article, a cup dispenser 6 providing a user with a cup of coffee or other tea, a can dispenser 7 providing a user with a can of cooling beverages, a lottery ticket dispenser 8, a coin reject slot 9 through which small change is output, and a display 10 on which various messages are displayed during operation.

Article selection panel 50 consists of can selection buttons 51, beverage selection buttons 52, and a lottery ticket button 53.

As shown in FIG. 2, inside of the vending machine are provided a cup column 11 holding a plurality of paper cups; a coin mechanism 54 sensing defect of the coins, put into the vending machine, an amount of input money, and an amount of change to be given back to users; a paper money mechanism 56 determining if paper money put into the vending machine is defective and sensing its amount; a lottery ticket dispensing unit 74; and a coin container 12 holding coins put into the vending machine through coin slot 4.

Referring to FIG. 3, the interior of the vending machine also has a water container 13; coffee powder receptacles 14 storing coffee powder, sugar, cream, etc.; a hot water supply vessel 15 holding hot water made by heating water from water container 13; raw material receptacles 16 storing raw materials for making great tea, black tea, hot chocolate, etc.; a mixing part 17 mixing raw materials from coffee powder receptacles 14 or raw material receptacles 16 with the hot water from hot water supply vessel 15 and supplying a mixture of them to cup dispenser 6; a bucket 18 collecting water used for cleaning or created by defrosting the vending machine; a cooling unit 19 producing cold to cans; and a rack 20 holding cans of cooling beverages.

The operation of the conventional vending machine is now described referring to FIGS. 1 to 3.

When a user puts a given amount of coins or paper money into the coffee vending machine through coin slot 4 or paper money slot 5, coin mechanism 54 or paper money mechanism 56 senses the amount of the input coins or paper money. If the amount of the input money is more than the price of each article for sale held in the vending machine, display 10 displays a message telling that the articles can be vended.

If a consumer selects a can of cool beverage by using can selection buttons 51 of article selection panel 50, the selected can is output to can dispenser 7 from rack 20 and dispensed to him or her.

If he or she selects a coffee or green tea by using beverage selection buttons 52 provided to article selection panel 50, materials for making the coffee or green tea, are supplied from coffee powder receptacles 14 or raw material receptacles 16 to mixing part 17 and mixed with hot water from hot water supply vessel 15 by mixing part 17. A mixture of them is provided to cup dispenser 6 and dispensed to him or her.

When the user manipulates lottery ticket button 53 on article selection panel 50, a lottery ticket is output to lottery ticket dispenser 8 from lottery ticket output part 74. The time it takes to dispense a cup of coffee or tea, a lottery ticket, and a can of cool beverage are respectively about 12 sec, 3 to 4 sec, and 100 to 125 msec. However, in case a user tries to obtain several articles (e.g. coffee, cans of cool beverages or lottery tickets) from the same vending machine, he or she has to select the next one after completion of dispensing him or her with the first article, which takes a long time and is inconvenient to use.

SUMMARY OF THE INVENTION

It is an objective of the present invention to provide a vending mechanism of a vending machine by which several articles for sale held in the vending machine can be simultaneously obtained within a short period of time.

In order to obtain the above-mentioned objective of the present invention, there is disclosed a vending mechanism for a vending machine including the steps of: if a user first selects an article by using an article selection panel after putting money into the vending machine, dispensing the user with the selected article; and if the user selects another article second by using the article selection panel and the remainder of the input money is more than the price of the second-selected article while supplying him or her with the first-selected article, dispensing him or her with the second-selected article.

DETAILED DESCRIPTION OF THE PREFERRED EMBODIMENTS

Figure 1:
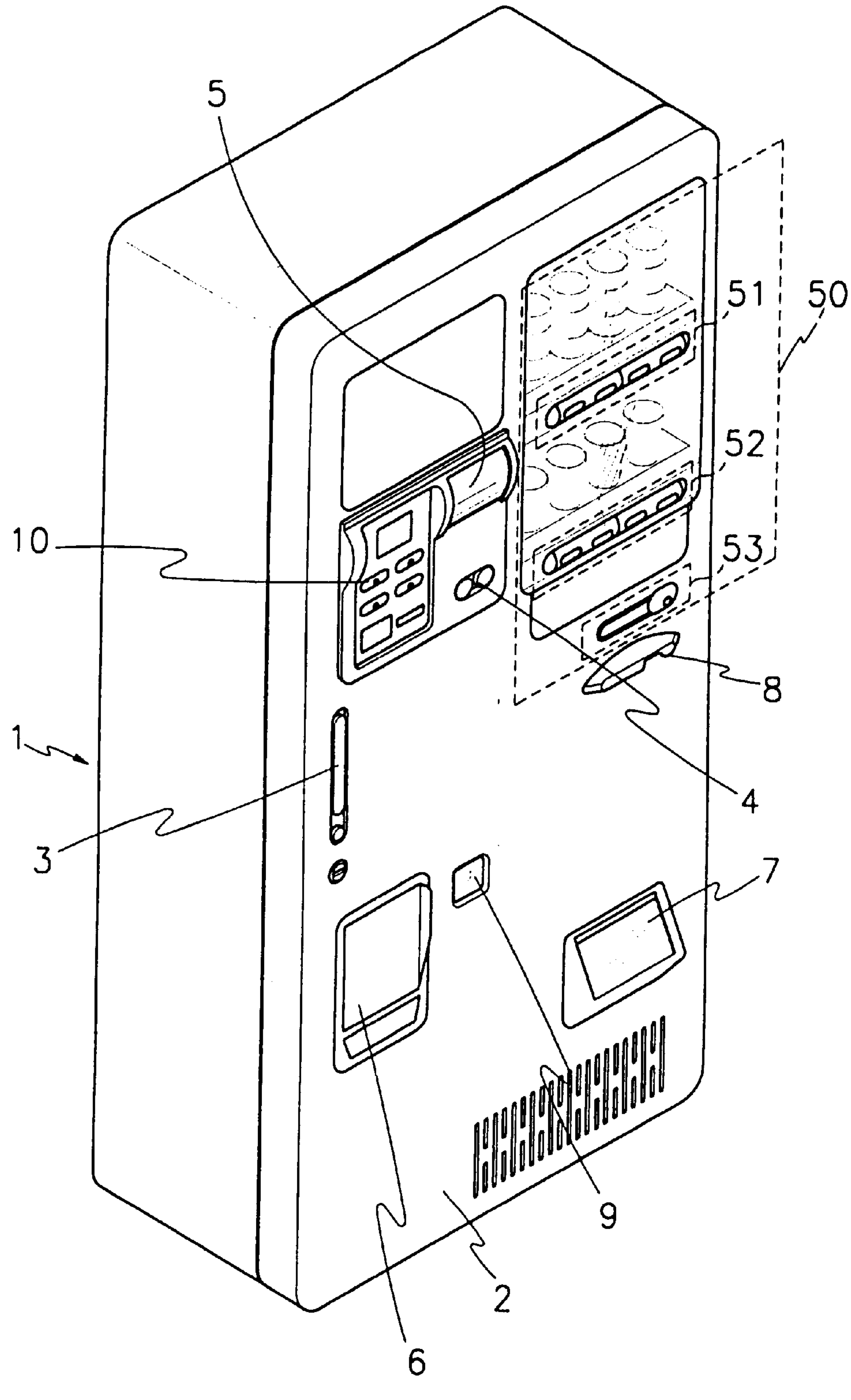
FIG. 1 PRIOR ART
FIG. 1 is a perspective view of the outer construction of a conventional vending machine.
Figure 2:
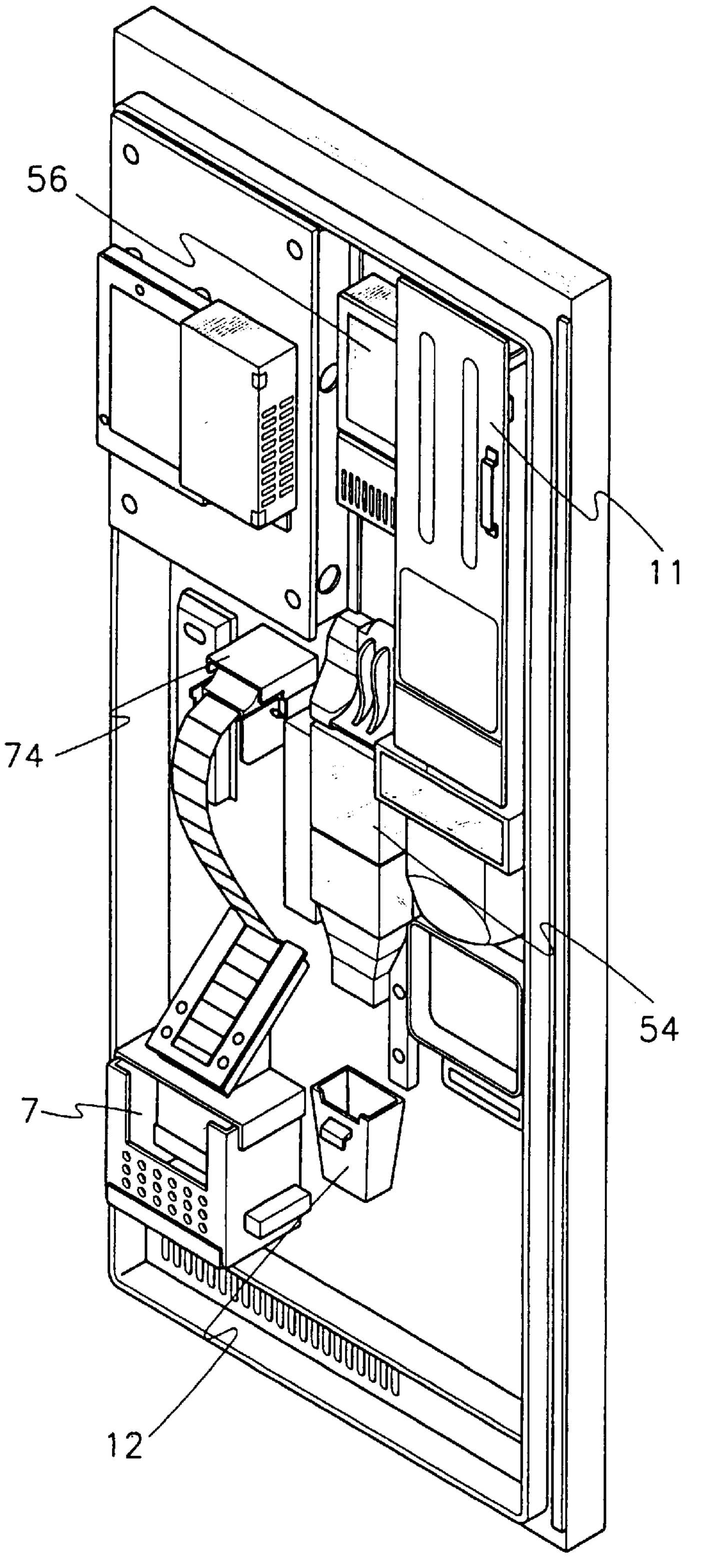
FIG. 2 PRIOR ART
FIG. 2 is a perspective view of the internal structure of the conventional vending machine of FIG. 1.
Figure 3:
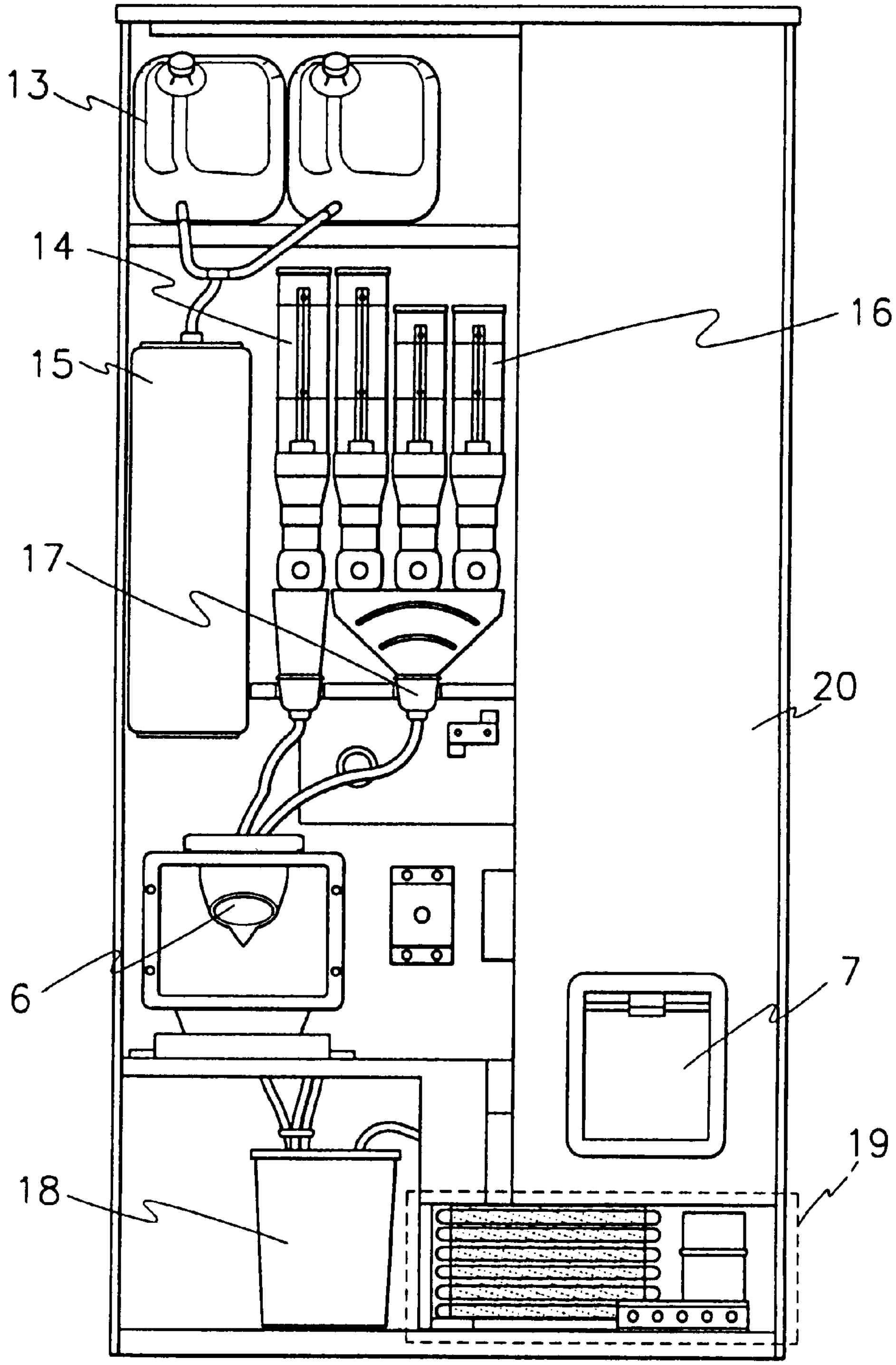
FIG. 3 PRIOR ART
FIG. 3 is a perspective view of the internal structure of the conventional vending machine of FIG. 1.

Preferred embodiments of the present invention will be fully described referring to the accompanying drawings. Similar reference numerals denote similar reference parts throughout the specification and drawings.

Figure 4:
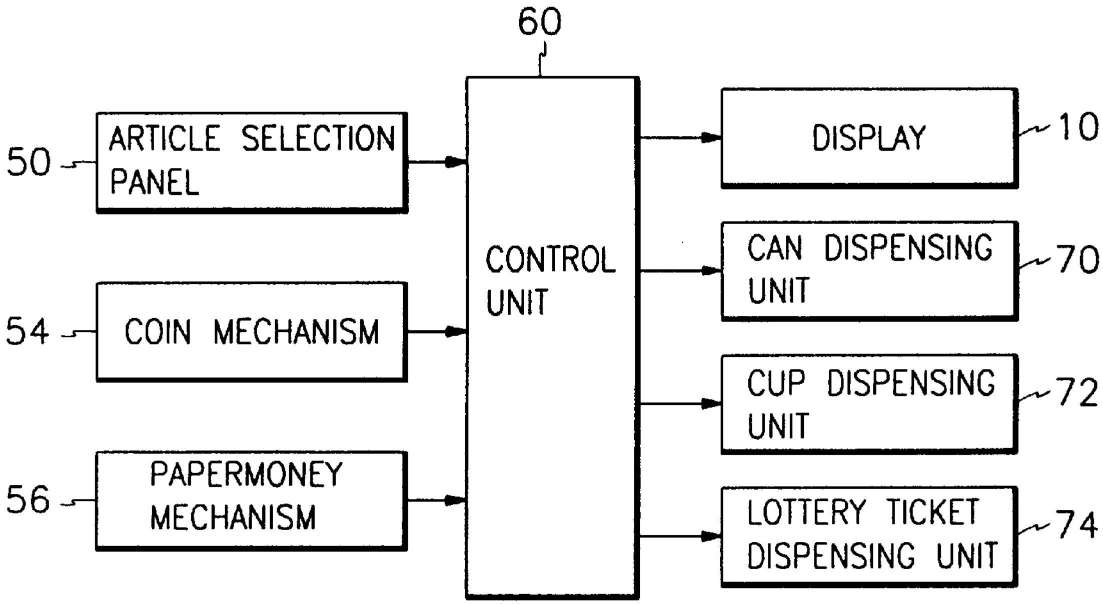
FIG. 4 is a block diagram of a vending mechanism of a vending machine in accordance with the present invention.

FIG. 4 is a block diagram of a vending mechanism of a vending machine in accordance with the present invention, and The vending machine includes an article selection panel 50, a coin mechanism 54, a paper money mechanism 56, a control unit 60, a display 10, a can dispensing unit 70, a cup dispensing unit 72, and a lottery ticket dispensing unit 74.

Each of these parts of FIG. 4 performs the same operation as that of parts of the conventional art described above, and the redundant description thereabout is omitted.

If another article is selected while the current remainder of input money is more than the price of each article for sale, held in the vending machine, during vending a first-selected article, control unit 60 generates a signal to output the second selected article, and can dispensing unit 70 outputs one of cans of cool beverages held in rack 20 to can dispenser 7 according to the output signal of control unit 60.

Cup dispensing unit 72 mixes raw materials for a user-selected cup of coffee or tea with hot water from a hot water supply vessel 15 according to an output signal of control unit 60, and outputs a mixture of them to a cup dispenser 6. Lottery ticket dispensing unit 74 outputs a user-selected lottery ticket to a lottery ticket dispenser 8 according to a signal from control unit 60.

Figure 5:
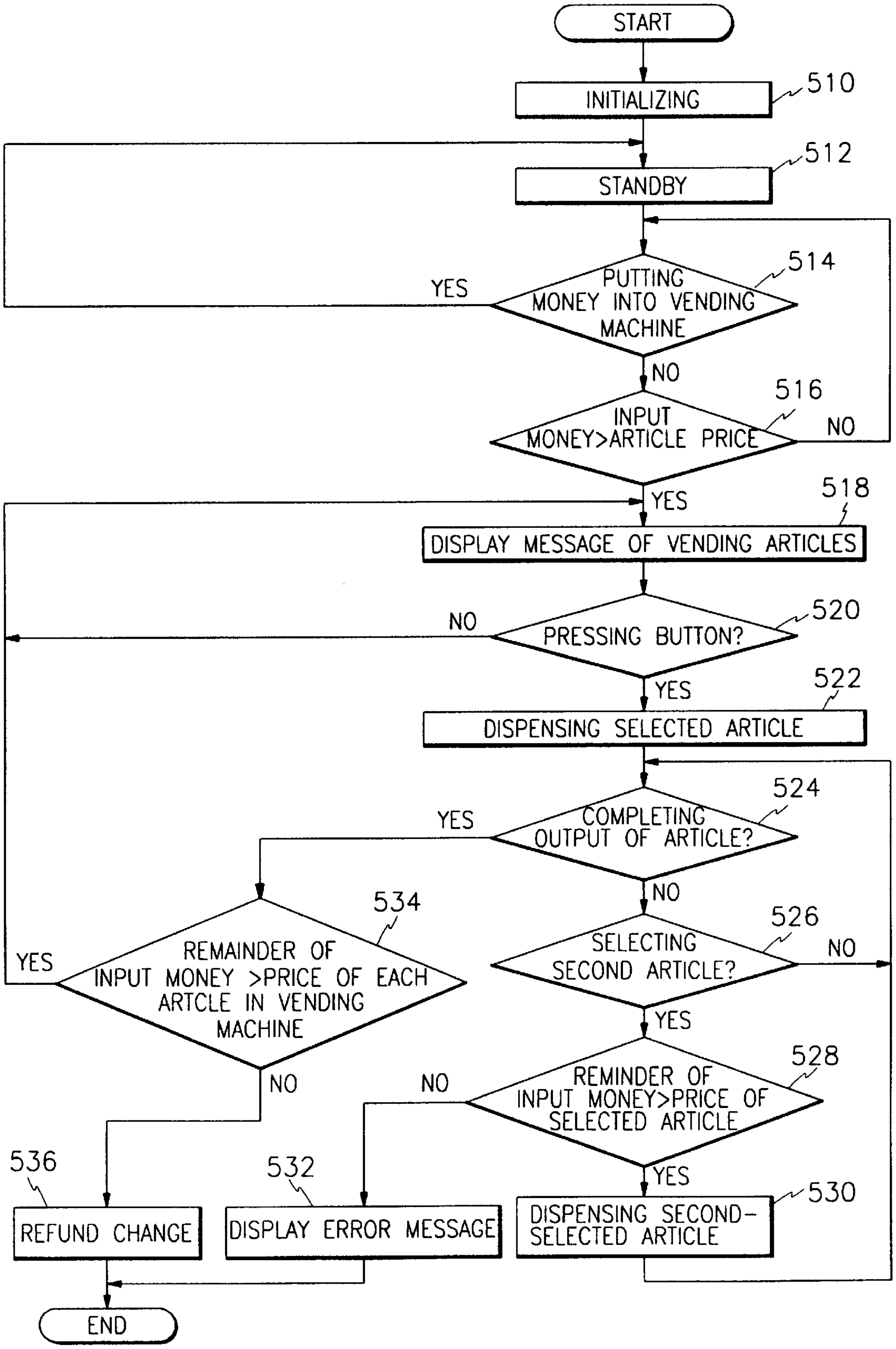
FIG. 5 depicts the control sequence of the vending mechanism of a vending machine in accordance with the present invention.

The inventive vending mechanism of the vending machine is now fully described referring to FIGS. 4 and 5.

If power is applied to the vending machine, the vending machine is initialized according to an output signal of control unit 60 (Step 510), and its mode is changed to standby mode (Step 512).

If a user puts coins or paper money into a coin slot 4 or a paper money slot 5 (Step 514), coin mechanism 54 or paper money mechanism 56 senses an amount of the input coins or paper money, and control unit 60 checks if the sensed amount of the input coins or paper money is more than the price of each article held in the vending machine (Step 516).

If control unit 60 determines that the amount of the input money is more than the price of each article for sale, it produces a signal to let display 10 present a message telling that each article can be vended (Step 518).

If a user manipulates (Step 520) one of can selection buttons 51, cup selection buttons 52 and a lottery ticket selection button 53, control unit 60 generates a control signal to output a corresponding article. According to this control signal, the user-first selected article is supplied (Step 522) to him or her through can dispensing unit 70, cup dispensing unit 72 or lottery ticket dispensing unit 74.

Control unit 60 checks (Steps 524 and 526) if another article is selected through article selection panel 50 while dispensing the user-first selected article to him or her at Step 522. If control unit 60 determines that another article is selected, it checks (Step 528) if the current remainder of the input money is more than the price of that article. If control unit 60 determines that the current remainder of the input money is more than the price, it produces a control signal to output the selected article from the vending machine. The second-selected article is dispensed (Step 530) to the user by can dispensing unit 70, cup dispensing unit 72, or lottery ticket dispensing unit 74 according to the control signal of control unit 60, and control unit 60 returns to Step 524 and checks if the output of the article is completed.

If control unit 60 determines that the current remainder of the input money is less than the price of the second-selected article, it produces (Step 532) a control signal to display a message, telling that the articles held in the vending machine cannot be vended, on display 10.

If control unit 60 determines that the output of the second-selected article is completed, it checks (Step 534) whether or not the current remainder of the input money is more than the price of each article in the vending machine. If control unit 60 determines that the remainder of the input money is more than the price of each article, it returns to Step 518 to repeat Steps 520 to 532. In case that control unit 60 determines that the remainder of the input money is less than the price of each article, it generates a signal to refund small change, and the change is output (Step 536) to a coin reject slot 9 through coin mechanism 54 according to the control signal of control unit 60.

According to the present invention, if a user selects another article by using the article selection panel while he or she obtains a first-selected one from the vending machine by putting coins or paper money into it and the remainder of the input money is more than the price of each article held in the vending machine, the second-selected article is dispensed to him or her through the can dispensing unit, cup dispensing unit or lottery ticket dispensing unit. Thus, the present invention allows users to obtain various articles held in the vending machine within a short period of time, which is very convenient to use.

What is claimed is:

1. A vending machine for vending one or more articles selected from a plurality of articles, each having a predetermined dispensing duration, comprising means for introducing money as payment for one or more of said articles, an article selection panel having means for selecting desired articles, storage means for said articles, dispensing means for said articles, and means for comparing the amount of money introduced to the machine to the total cost of selected article(s) and for dispensing only those selected articles for which the introduced money is sufficient to equal or exceed their cost, characterized by the machine having selecting means which enable the user to select a second article during the dispensing duration of a first selected article whereby the combined duration of selecting and dispensing the selected articles overlaps and is reduced.

2. A vending machine according to claim 1 which further comprises display means advising the user whether the amount of introduced money is sufficient to cover the cost of the selected articles.

3. A vending machine according to claim 1 which further comprises means for comparing the total amount of introduced money with the total cost of dispensed articles, and means for refunding the difference to the user.

4. A vending machine according to claim 1 which comprises means for introducing money in the form of coins, and means for introducing paper money.

5. A vending machine according to claim 1 comprising a plurality of different dispensing units, one for each different type of articles being vended.

6. A vending machine according to claim 5 comprising cup dispensing units for dispensing liquid beverages, and dispensing units for dispensing dry goods.

7. A method for vending one or more articles from a vending machine capable of dispensing a plurality of different articles, each having a predetermined dispensing duration, comprising the steps of entering into the vending machine a sufficient amount of money to cover the cost of at least one of the articles; activating the machine to select a desired first article to be dispensed and, during the dispensing duration of said first article, activating the machine to select a desired second article to be dispensed, the selecting and dispensing of which is initiated during the dispensing duration of said first article, provided that the amount of money entered into the vending machine is sufficient to cover the cost of both the first and second selected articles.

8. The method according to claim 7 in which said articles comprise liquids which are dispensed into a cup and which have a relatively long dispensing duration, and dry goods which have a relatively short dispensing duration, comprising selecting a cup-dispensed liquid as the desired first article, and selecting a dry goods product as the desired second or subsequent article, to permit the dry goods products to be completely dispensed before the dispensing duration of the first article is expired.

* * * * *